US006285940B1

(12) United States Patent
Henneken et al.

(10) Patent No.: US 6,285,940 B1
(45) Date of Patent: Sep. 4, 2001

(54) METHOD FOR CONTROLLING AN AUTOMATIC GEARBOX

(75) Inventors: Markus Henneken, Kressbronn; Friedemann Jauch, Meckenbeuren; Kai-Uwe Herbster, Friedrichshafen; Franz-Josef Schuler; Thomas Mauz, both of Kressbronn, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/508,566

(22) PCT Filed: Sep. 21, 1998

(86) PCT No.: PCT/EP98/06015

§ 371 Date: Mar. 13, 2000

§ 102(e) Date: Mar. 13, 2000

(87) PCT Pub. No.: WO99/15815

PCT Pub. Date: Apr. 1, 1999

(30) Foreign Application Priority Data

Sep. 25, 1997 (DE) .............................. 197 42 313

(51) Int. Cl.[7] .............................. G06F 7/00; B60K 41/04
(52) U.S. Cl. .................. 701/55; 701/51; 477/34; 477/107; 477/108
(58) Field of Search .................. 701/51, 52, 54, 701/55, 56; 477/34, 107, 108, 110

(56) References Cited

U.S. PATENT DOCUMENTS

| | | | |
|---|---|---|---|
| 4,526,255 | * | 7/1985 | Hennessy et al. .................. 192/3.58 |
| 4,928,235 | * | 5/1990 | Mehta et al. . |
| 5,319,963 | * | 6/1994 | Benford . |
| 6,113,515 | * | 9/2000 | Salecker et al. ........................ 477/72 |

FOREIGN PATENT DOCUMENTS

| | | | |
|---|---|---|---|
| 39 22 051 C2 | * | 1/1991 | (DE) . |
| 39 28 814 A1 | * | 3/1991 | (DE) . |
| 196 12 928 A1 | * | 10/1996 | (DE) . |
| 195 45 588 A | * | 6/1997 | (DE) . |
| 0482 691 A | * | 4/1992 | (EP) . |

* cited by examiner

*Primary Examiner*—William A. Cuchlinski, Jr.
*Assistant Examiner*—Yonel Beaulieu
(74) *Attorney, Agent, or Firm*—Davis & Bujold, P.L.L.C.

(57) ABSTRACT

When a cold start condition exists, an electronic gear control (4) calculates for an automatic transmission (3) driven by an internal combustion engine (1) the energy throughput of the internal combustion engine (1). The energy throughput is added up and compared with a limit value. The shift points of the automatic transmission (3) are pushed up to higher values as long as the calculated value remains less than the limit value.

8 Claims, 4 Drawing Sheets

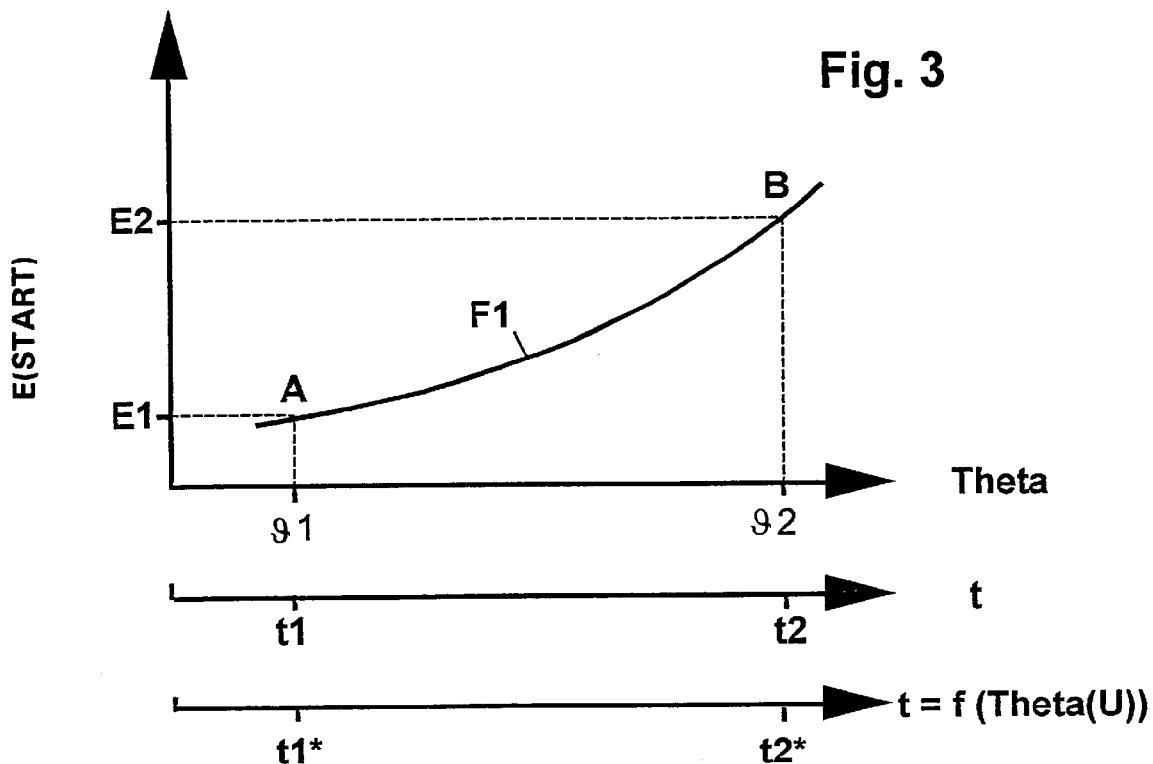
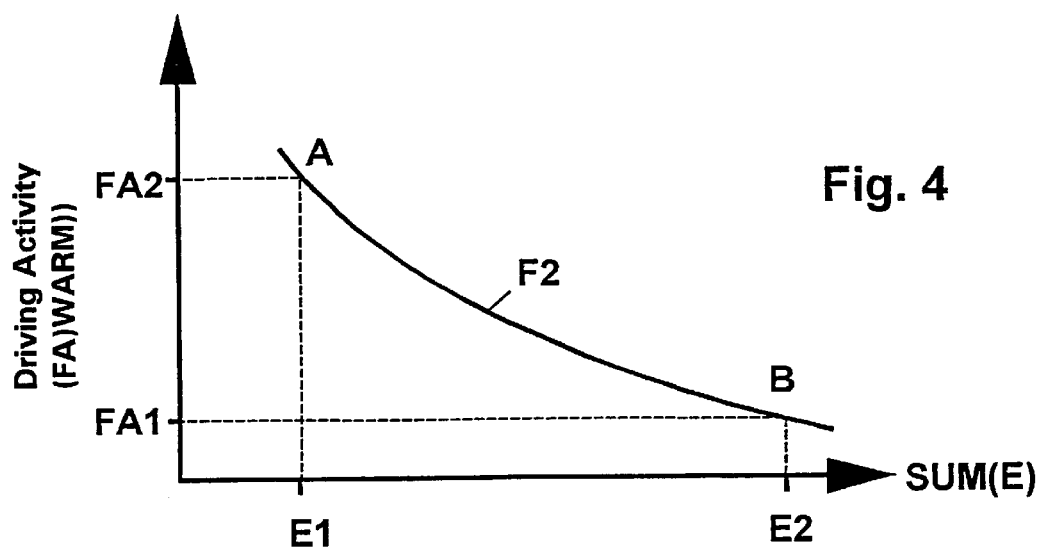

METHOD FOR CONTROLLING AN AUTOMATIC GEARBOX

BACKGROUND OF THE INVENTION

The invention relates to a method for control of an automatic transmission driven by an internal combustion engine wherein an electronic gear control tests whether a cold start condition exists.

In electrohydraulic automatic transmissions, a so-called warm-up program or warm-up shift characteristic field is usually integrated in the software of the electronic gear control. When the warm-up program is activated, the shift points of the automatic transmission are moved to higher rotational speed values of the internal combustion engine or of the transmission output rotational speed. Hereby is obtained that the internal combustion engine and the catalyst warm up quicker and thus more quickly reach the ideal operating temperature. Thus, DE-OS 39 28 814, e.g. proposes that a cold start condition of the motor vehicle is detected by means of a temperature sensor, and that for a limited period of time the electronic gear control, via a warm-up shift program, shifts the gear steps of the automatic transmission. It is also proposed that the temperature detected by the sensor is the coolant temperature of the internal combustion engine or the temperature of the ATF (automatic transmission fluid).

The time step, mentioned in the above described prior art, is usually determined by the passenger car manufacturers by means of exhaust gas test on a roller test bench. The problem resulting from this is that the actual road operation differs from the exhaust gas. For example, if the vehicle is already stopped after a short time and again started, the time step again begins to run in all its length.

The problem, which the invention is based, consists in developing a warm-up program oriented to the actual driving operation.

According to the invention, a first solution of the problem consists in that the electronic gear control, when the cold start condition exists, determines from the torque generated by the internal combustion engine and the rotational speed thereof, the power generated by the internal combustion engine. From two power values calculated within one time period, the energy throughput is determined and added to the former energy throughput. With the added energy throughput is then associated, via a characteristic line, a first driving activity wherein the first driving activity causes higher shift points of the automatic transmission. Thereafter, the electronic gear control compares the first driving activity with the second driving activity, the second driving activity being determined from the actual behavior of the driver. The second driving activity can be determined, e.g. by means of a method such as disclosed in German Patent 39 22 051. The first inventive solution is thus preferably applicable to automatic transmissions which have available a so-called "intelligent shift program" i.e. a shift point is selected in accordance with the driver's behavior.

In a development of this, it is proposed that the first driving activity determines the shift points of the automatic transmission when the activity is greater than the second driving activity. In one other development, it is proposed that the second driving activity determines the shift points when the first driving activity is lesser than or equal to the second driving activity.

The inventive solution and the developments thereof offer the advantage that the actual state of the internal combustion engine, i.e. the temperature can be clearly determined by its energy throughput. By the summing up and the first driving activity resulting therefrom, it is brought about that the shift points be moved to higher values. The coordination by means of characteristic line is here carried out in a manner such that a higher sum of the energy throughput produces a lower first driving activity. By the two developments, i.e. according to the comparison of the first with the second driving activity, the warm-up program is activated or de-activated.

According to the invention, the second solution of the problem consists of the electronic gear control determines the energy throughput calculated from the generated power of the internal combustion engine and adds it to the former energy throughput. Thereafter, the summed up energy throughput is compared with a limit value and the shift program preset by a driver is activated when the summed up energy throughput is higher than the limit value. This solution is thus preferably applicable to automatic transmissions where a driver can manually select a shift program such as economy, sport or winter.

SUMMARY OF THE INVENTION

In development of both the first and the second inventive solutions, it is proposed that the electronic gear control, when the cold start condition is detected, additionally tests whether a new start of the vehicle exists. In development of this, it is proposed that when restarting an initial value of the summed up throughput be defined by a characteristic line according to the temperature of the internal combustion engine. Alternatively to this, it is proposed to use, instead of the temperature of the internal combustion engine, the time elapsed since stoppage of the vehicle. The advantage attained by the two developments is, that account is taken of the situation when the vehicle after a short distance is stopped and started again. In this case, the summing up of the energy throughput does not begin at zero but at an initial value defined by a characteristic line.

In a development of this, it is proposed that the time elapsed since stopping of the vehicle additionally constitutes a function of the environment temperature. Here, account is taken of the circumstance that the cooling off behavior of the internal combustion engine during stoppage changes, according to the temperature of the environment.

BRIEF DESCRIPTION OF THE DRAWINGS

A preferred embodiment is shown in the drawings where:

FIG. 3 is a characteristic line E (START)=f(THETA);

FIG. 4 is a characteristic line FA (WARM)=F(SUM(E)); and

DESCRIPTION OF THE PREFERRED EMBODIMENTS

Figure 1:
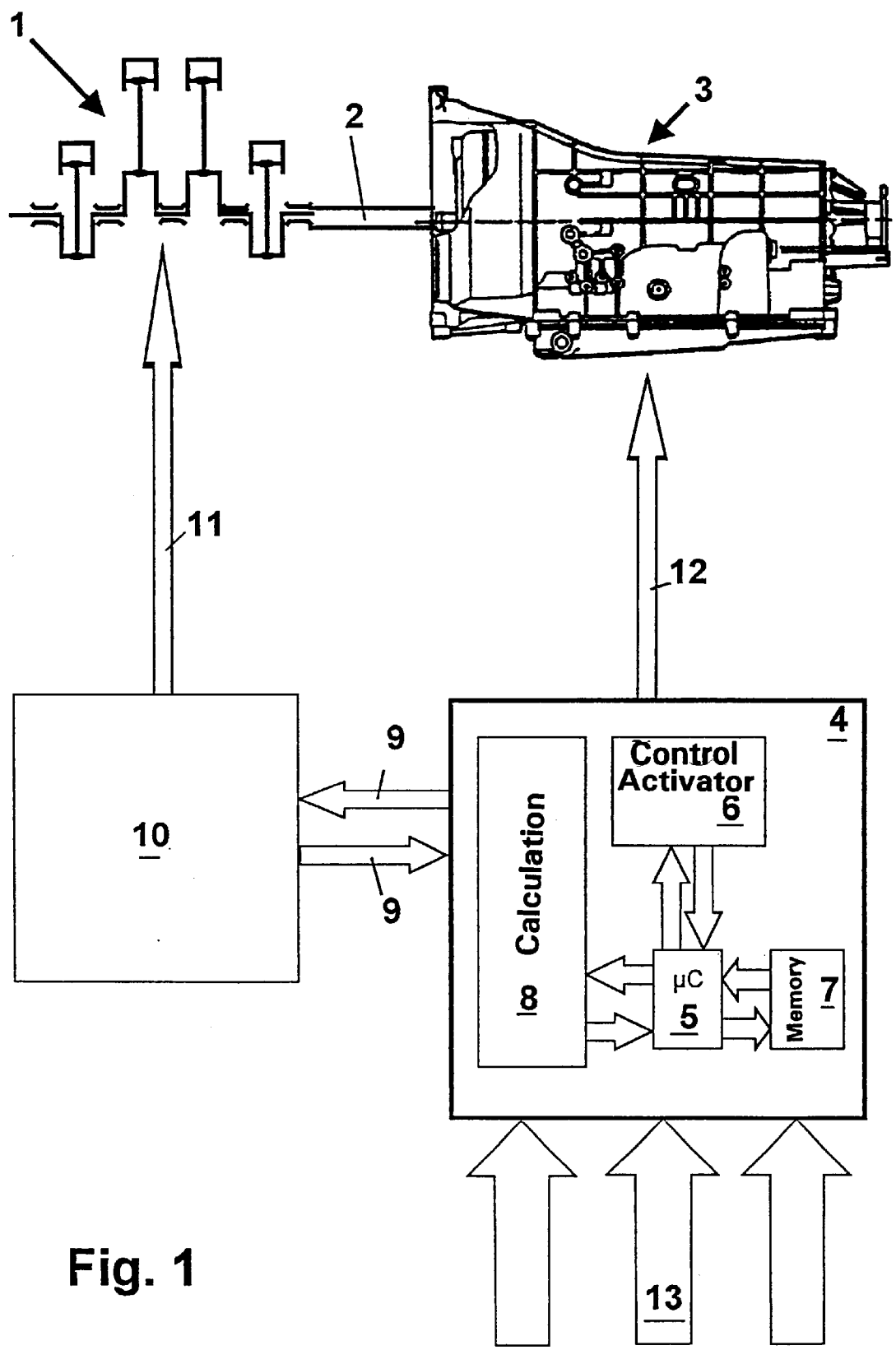
FIG. 1 is a system diagram.

FIG. 1 shows a system diagram of an internal combustion engine/automatic transmission unit. It consists of the internal combustion engine 1, the automatic transmission 3, an electronic gear control 4 and an electronic engine control unit 10 which controls the internal combustion engine, via control lines 11. Internal combustion engine 1 and automatic transmission 3 are mechanically interconnected by an input shaft 2. The electronic engine control unit 10 and the electronic gear control 4 are interconnected by data lines 9. The two control units communicate via the data lines, e.g. by means of CAN bus. On the data lines, the electronic engine control unit 10, e.g. prepares the following information: torque of the internal combustion engine MM, rotational speed of the internal combustion engine nMOT, temperature of the coolant fluid of the internal combustion engine, etc. The electronic gear control 4 makes available as information on the data lines 9, e.g. the start and end of a gear shift, the so-called engine meshing or a theoretical engine torque.

The electronic gear control 4 selects in accordance with input variables 13 a corresponding driving step or a shift program. Via a hydraulic control unit, which is integral part of the automatic transmission 3 and in which electromagnetic actuators are located, the electronic gear control 4 then activates, via control line 12, a corresponding clutch/brake combination. Of the electronic gear control 4, there are shown as blocks in extensively simplified manner; microcontroller 5, memory 7, function block control actuators 6 and function block calculation 8. In the memory 7 are deposited the data relevant to the transmission. Data relevant to the transmission are, e.g. program, shift characteristic lines, characteristic fields and specific characteristics of the vehicle and also diagnosis data. The memory 7 is usually designed as EPROM, EEPROM or as buffered RAM. In the function block calculation 8 are calculated the data relevant to the operation of the automatic transmission 4 such as the pressure level. The function block control actuators 6 serves to control the actuators located in the hydraulic control unit.

The input variables 13 of the electronic gear control 4 are, e.g. a variable representative of the performance desired by the driver like accelerator pedal/throttle valve position or manually required shifts, the transmission input and output rotational speeds, the temperature of the ATF (automatic transmission fluid), etc.

Figure 2:
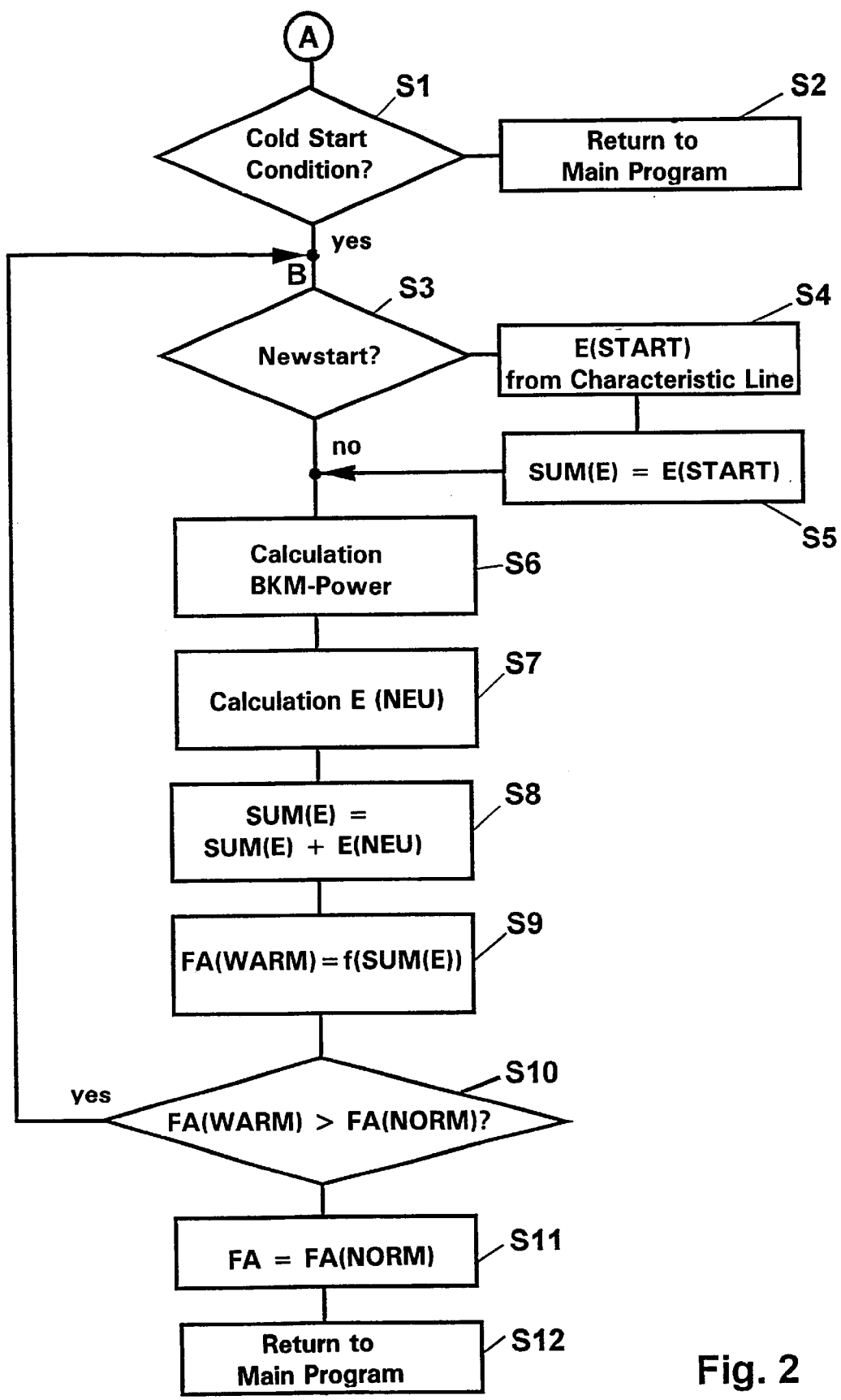
FIG. 2 is a program flow chart.

FIG. 2 shows a program flow chart. This part can be designed as a sub-program within the existing software of the gear control starting at point A. The electronic gear control 4 tests in step S1 whether a cold start condition exists. The cold start condition exists when the cold water temperature of the internal combustion engine or alternatively the temperature of the ATF is lower than a limit value such as 30° C. If the cold start condition does not exist, i.e. the internal combustion engine/automatic transmission have operating temperature, then the main program is returned to with S2. When the inquiry result in S1 is positive, it is tested in step S3 whether a new start exists. When the inquiry result is positive, i.e. the vehicle was started again, an initial value E(START) for the energy throughput/summed up memory is selected in step S4 via a characteristic line. The characteristic line is shown in FIG. 3 and explained in combination therewith. In step S5 the start value E(START) is coordinated with the energy throughput summed up memory SUM(E). Thereafter the program cycle is continued in step S6. In case of negative inquiry results in step S3, i.e. the vehicle is operating, the program cycle is continued in step S6. At step S6, the actual power of the internal combustion engine at a first and second moment is calculated according to the following equation:

$$P(i)=MM(i) \cdot nMOT(i) \cdot K \ i=1, 2, 3 \ldots n$$

The meanings are the following:
MM the actual torque generated by the internal combustion engine;
nMOT the actual value of the internal combustion engine; and
K a conversion constant and i a numeric variable.

The energy throughput (E(NEU)) is calculated in step S7. This is done by adding two power values within one period of time, e.g. 100 ms. The following equation applies:

$$E(NEU)=(P(i)+P(i+1)) \cdot dt.$$

The meanings here are the following:
(P(i), P(i+1)) the two power values; and
dt the time period.

The energy throughput E(NEU) obviously can also be calculated by forming a medium value of both power values P(i), P(i+1).

In step S8, the calculated energy throughput E(NEU) and the former content of the energy throughput sum memory SUM(E) are added up. According to the content of the energy throughput sum memory SUM(E), a driving activity FA(WARM) is then selected in step S9. This takes place by means of the characteristic line shown in FIG. 4.

In step S10, the first driving activity FA(WARM) is compared with a second driving activity FA(NORM). This second driving activity is determined here from the actual behavior of the driver. This can be done, e.g. in the manner proposed in German Patent 39 22 051. In step S10, if it is established that the first driving activity is greater than the second driving activity, then the program branches off to point B and starts again with step S3, namely, the question of whether a new start exists. If the inquiry in step S10 is negative, i.e. the first driving activity is less than or equal to the second driving activity, then the program branches off to step S11. The inquiry step S10 is negative when the internal combustion engine had an accordingly greater energy throughput so that the internal combustion engine or the catalyst has reached the operation temperature. In step S11, the second driving activity FA(NORM) is then set as actually valid driving activity FA. Hereby the shift points are selected exclusively depending on the driver's behavior. In step S12, the program cycle terminates and the main program is returned to.

In FIG. 3 is shown a characteristic line F1. As first abscissa theta is plotted here, the temperature of the coolant fluid of the internal combustion engine or, alternatively, the temperature of the ATF. Here both values theta 1 and theta 2 represent a temperature range of, e.g. −20 to +130° C. The initial value of an energy throughput E(START) is plotted as ordinate. Via the characteristic line F1 with the two limit points A and B is thus associated with the temperature range theta 1, theta 2 a corresponding range of the initial values (E1, E2). The range of the initial values of the energy throughput E(START) can be, e.g. from 0 to 2.5 kWh. The maximum value of E2 depends here on the vehicle.

Likewise shown in FIG. 3 is a second abscissa t representative of the time. The alternative can be used instead of the temperature theta. By the time t is to be understood, the time elapsed since stoppage of the vehicle until the new start. The time period t1/t2 plotted on the abscissa corresponds, e.g. to the time period of from 5 min. to 8 hrs. In FIG. 3 is likewise plotted a third abscissa t with the time period t1*/t2*. This time period, additionally, depends on the temperature of the environment. Hereby is taken into account the circumstance that the cooling off behavior of the internal combustion engine in non-operated state depends on the temperature of the environment.

In FIG. 4 is shown a characteristic line F2 with the joints A and B. On the abscissa is plotted the content of the energy throughput sum memory SUM(E) with both joints E1 and E2. On the ordinate is plotted the first driving activity FA(WARM) with the two joints FA1 and FA2. With the value of the energy throughput sum memory SUM(E) is thus associated via the characteristic line F2 a first driving activity. The first driving activity can assume, as shown for example, in German Patent 39 22 051, values of 1, 2, 3, 4 and 5 corresponding to the range FA1 to FA2. Evidently, it is also possible to show the range FA1/FA2 as a meter, e.g. in the 0 to 255 range. As shown in FIG. 2, the first driving activity FA(WARM) is compared with the second driving activity FA(NORM) in step S10. According to the comparison, the shift point is, from now on, determined either via the first driving activity or via the second driving activity. The second driving activity FA(NORM) is here determined exclusively from the driver's behavior.

Figure 5:
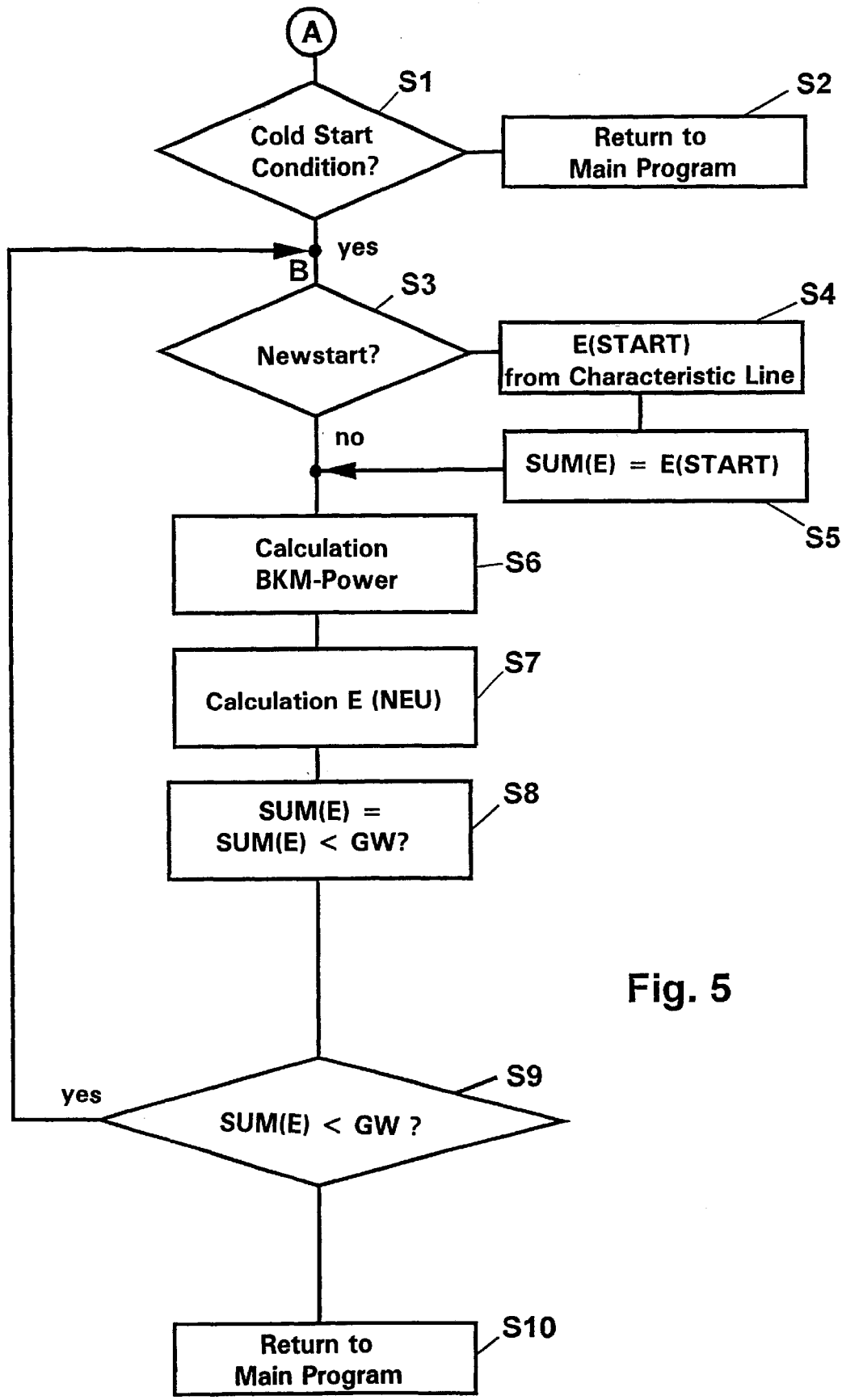
FIG. 5 is a program flow chart.

In FIG. 5 is shown a program flow chart of the second inventive solution. This solution can always be used when the software of the electronic gear control 4 contains no so-called intelligent shift program, such as described in German Patent 39 22 051. In other words, the inventive solution always recommends itself when the driver can select a shift program (E/S/W), e.g. by means of a switch. The program flow chart of FIG. 5 up to step S8 is identical with the program flow chart of FIG. 2 so that what is described there applies. In step S9, the electronic gear control tests whether the content of the sum energy memory SUM(E) is lesser than a limit value. The limit value can amount, e.g. to 2.5 kWh. This is dependent on the vehicle. If the test in step S9 results in that the sum energy memory SUM(E) is less than the limit value, the program flow chart branches off to point B and moves on with the step S3 with the inquiry of whether a new start exists.

If the inquiry is negative, i.e. the internal combustion engine has exceeded a corresponding energy throughput, the main program is returned to in step S10.

| Reference numerals | |
| --- | --- |
| 1 internal combustion engine | 8 function block calculation |
| 2 input shaft | 9 data line |
| 3 automatic transmission | 10 electronic engine control unit |
| 4 electronic gear control | 11 control line |
| 5 micro-controller | 12 control line |
| 6 function block control actuators | 13 input variables |
| 7 memory | |

What is claimed is:

1. A method for control of an automatic transmission (3) driven by an internal combustion engine (1) comprising the steps of:

testing, using an electronic gear control (4), whether a cold start condition exists, wherein when a cold start condition exists;

determining, using said electronic gear control (4), from the torque (MM) generated by said internal combustion engine (1) and the rotational speed thereof (nMOT), the power (P) generated by said internal combustion engine (P(i)=MM(i)·nMOT(i)·K, i=1. 2 . . . n, k=constant);

determining from two power values (P(i), P(i+1)) calculated within one time period (dt), an energy throughput (E(NEU)) (P(i)+P(i+1))·dt;

adding (SUM(E)), via a characteristic line associated with the summed up energy throughput (SUM(E)) a first driving activity (FA(WARM)) (FA(WARM))=f(SUM (E)), the first driving activity (FA(WARM)) producing higher shift points of said automatic transmission and comparing, using said electronic gear control (3) the first driving activity (FA(WARM) with a second driving activity (FA(NORM)) (S10), wherein the second driving activity (FA(NORM)) is determined from the actual behavior of a driver.

2. The method according to claim 1, further comprising the steps of:

determining the shift points of said automatic transmission via the second driving activity (FA(NORM)) when the first driving activity (FA(WARM)) is greater than the second driving activity (FA(NORM)).

3. The method according to claim 1, further comprising the step of:

determining the shift points of said automatic transmission (3) via the second driving activity (FA(NORM)) when the first driving activity (FA(WARM)) is less than or equal to the second driving activity (FA(NORM)).

4. The method according to claim 1, wherein when a cold start condition exists, said electronic gear control (4) determines from the torque (MM) generated by said internal combustion engine (1) and the rotational speed thereof (nMOT) the power (P) generated by said internal combustion engine (P(i)=MM(i)·nMOT(i)·K, i=2 . . . n, k=constant), determines from two power values (P(i), (i+1)) calculated within onetime period (dt), an energy throughput (E(NEU)) (E(NEU))=(P(i)+P(i+1))·dt and adds (SUM(E)), said electronic gear control (3) compares the summed up energy throughput (SUM(E)) with a limit value (GW) and activates a shift program preset by the driver when the summed up energy throughput (SUM(E)) is greater than the limit value (GW) (SUM(E)>GW).

5. The method according to claim 1, wherein when the cold start condition exists, further comprising the step of:

testing, using said electronic gear control (3), whether a new start of the vehicle exists (S3).

6. The method according to claim 4, during the new start, further comprising the step of:

defining an initial value (E(START)) of the summed up energy throughput (SUM(E)) via a characteristic line accordance with the temperature (THETA) of said internal combustion engine (1).

7. The method according to claim 4, during the new start, further comprising the step of:

defining an initial value (E(START)) of the summed up energy throughput (SUM(E)) via a characteristic line according to the time (t) elapsed since stoppage of the vehicle.

8. The method according to claim 6, the time (t) additionally represents a function of the environment temperature (THETA(U)) (t=f(THETA(U)).

* * * * *